US009619915B2

(12) United States Patent
Wang et al.

(10) Patent No.: US 9,619,915 B2
(45) Date of Patent: Apr. 11, 2017

(54) METHOD AND APPARATUS FOR CONVERTING AN ANIMATED SEQUENCE OF IMAGES INTO A DOCUMENT PAGE

(75) Inventors: Ye Wang, Beijing (CN); Hongbing Zhou, Beijing (CN)

(73) Assignee: ADOBE SYSTEMS INCORPORATED, San Jose, CA (US)

( * ) Notice: Subject to any disclaimer, the term of this patent is extended or adjusted under 35 U.S.C. 154(b) by 694 days.

(21) Appl. No.: 13/009,465

(22) Filed: Jan. 19, 2011

(65) Prior Publication Data

US 2015/0199837 A1    Jul. 16, 2015

(51) Int. Cl.
G06F 17/00 (2006.01)
G06T 13/80 (2011.01)
G06F 17/22 (2006.01)

(52) U.S. Cl.
CPC .......... G06T 13/80 (2013.01); G06F 17/2247 (2013.01); G06F 17/2264 (2013.01)

(58) Field of Classification Search
CPC .................. G06F 17/2247; G06F 17/2264
USPC ................... 715/201, 204, 239, 723
See application file for complete search history.

(56) References Cited

U.S. PATENT DOCUMENTS

| 5,528,259 | A | 6/1996 | Bates et al. |
| 6,172,672 | B1* | 1/2001 | Ramasubramanian et al. ............. 715/720 |
| 6,369,835 | B1* | 4/2002 | Lin .................. 715/726 |
| 6,374,260 | B1* | 4/2002 | Hoffert et al. |
| 7,398,464 | B1* | 7/2008 | Wei et al. ............... 715/239 |
| 7,643,705 | B1* | 1/2010 | Erol et al. .............. 382/305 |
| 7,698,645 | B2* | 4/2010 | Fuse ................... 715/730 |
| 7,890,985 | B2* | 2/2011 | Bowra et al. ........... 725/88 |
| 8,495,074 | B2* | 7/2013 | Weber ........... G06F 17/30056 707/755 |
| 2002/0087592 | A1* | 7/2002 | Ghani ................ 707/500 |
| 2003/0023758 | A1* | 1/2003 | Yoshikawa et al. ........ 709/247 |
| 2003/0145023 | A1* | 7/2003 | Bennett et al. ............ 707/205 |
| 2004/0021679 | A1* | 2/2004 | Chapman et al. ........ 345/700 |
| 2005/0041872 | A1* | 2/2005 | Yim et al. .............. 382/232 |
| 2005/0114373 | A1 | 5/2005 | Kulp et al. |
| 2006/0253791 | A1 | 11/2006 | Kuiken et al. |
| 2007/0122024 | A1* | 5/2007 | Haas ................ G06Q 20/04 382/137 |
| 2007/0168542 | A1* | 7/2007 | Gupta et al. ............. 709/231 |
| 2008/0195692 | A1* | 8/2008 | Hayosh et al. ............ 709/202 |
| 2008/0266246 | A1 | 10/2008 | Ladin et al. |

(Continued)

FOREIGN PATENT DOCUMENTS

JP    2003-122604 A    4/2003
JP    2004-295361 A    10/2004

OTHER PUBLICATIONS

TrickyWays, 'Hot to Save PowerPoint 2010 Presentation as PDF File' published Sep. 19, 2009.*

*Primary Examiner* — Stephen Hong
*Assistant Examiner* — Matthew Ludwig
(74) *Attorney, Agent, or Firm* — Keller Jolley Preece

(57) ABSTRACT

A method and apparatus for converting an animated sequence of images into a document page is described. In some embodiments, the method includes accessing a first file comprising a plurality of images and attribute data associated with displaying the plurality of images, creating a second file using data from the first file and for at least one of the plurality of images, creating a content partition on a corresponding document page of the second file using the attribute data.

20 Claims, 6 Drawing Sheets

(56) References Cited

U.S. PATENT DOCUMENTS

2009/0265367 A1* 10/2009 Corbett .................. 707/102
2010/0169784 A1* 7/2010 Weber et al. ............ 715/731
2015/0370804 A1* 12/2015 Weber ............ G06F 17/30058
707/738

* cited by examiner

METHOD AND APPARATUS FOR CONVERTING AN ANIMATED SEQUENCE OF IMAGES INTO A DOCUMENT PAGE

BACKGROUND

Technical Field

Embodiments of the present application generally relate to document conversion systems and, more importantly, to a method and apparatus for converting an animated sequence of images into a document page.

Description of the Related Art

The rapid proliferation of multimedia content (i.e., user interactive controls and application generated controls that create an exciting and interesting multimedia experience) throughout the Internet was caused by numerous technological innovations. Users spend a significant amount of time conducting various activities (e.g., surfing educational websites, viewing detailed product demonstrations, accessing digital libraries and participating in expert discussion forums related to the multimedia content). These users often download and view various content (e.g., multimedia content, textual content and/or the like) on various display devices (e.g., a mobile phone, an electronic book reader, a Personal Digital Assistant (PDA), a hand-held gaming device and/or the like from various Internet resources (e.g., web pages, multimedia clips and/or content, emails and/or the like).

Sometimes, multimedia content is presented to the user as an animated sequence of images where an ordering of the images is critical to conveying a particular concept. For example, the user views an animation effect on a MICROSOFT® PowerPoint Presentation that illustrates the stock price changes over several days. Each portion of the animation effect is an image depicting several stocks and each stock price at the end of a certain trading day. The subsequent portion is another image depicting stock prices at the end of a next trading day. Hence, each image bears a temporal relationship with previous and/or subsequent images in the animated sequence.

The multimedia content is stored in a file having a particular format, such as a MICROSOFT® PowerPoint Presentation. If the user desires to view the multimedia content as a document, the user must convert the file into another file of a different format, such as a Portable Document Format (PDF) file. PDF is an open standard for document exchange created by Adobe Systems of San Jose, Calif. Unfortunately, current conversion techniques do not retain the multimedia content as the animated sequence of images. Instead, the current conversion techniques cause the multimedia content to be stored as static graphical data. All of the images of the animated sequence are rendered on a single document page and presented to the user as one image. Furthermore, the user is unable to interact with the multimedia content.

Therefore, there is a need in the art for an improved method and apparatus for converting an animated sequence of images into a document page.

SUMMARY

Various embodiments of the present application generally comprise a computerized method and apparatus for converting an animated sequence of images into a document page. In some embodiments, a first file comprising a plurality of images is accessed. The first file also comprises attribute data associated with displaying the plurality of images. A second file is created using data from the first file and for at least one of the plurality of images. A content partition is created on a corresponding document page of the second file using the attribute data.

Figure 1:
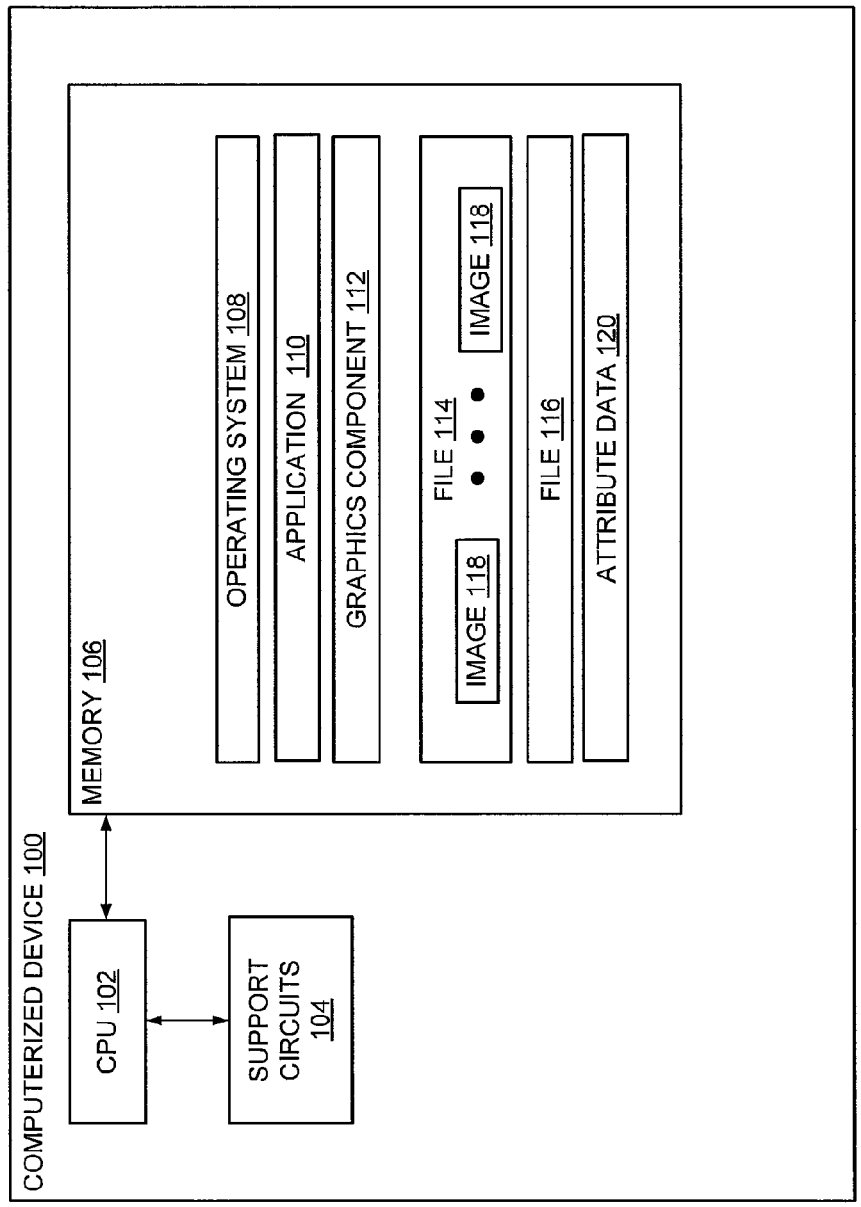
FIG. 1 is a block diagram of a computerized device for converting an animated sequence of images into a document page according to one or more embodiments.

While the method and apparatus for converting an animated sequence of images into a document page is described herein by way of example for several embodiments and illustrative drawings, those skilled in the art will recognize that the method and apparatus for converting an animated sequence of images into a document page is not limited to the embodiments or drawings described. It should be understood, that the drawings and detailed description thereto are not intended to limit embodiments to the particular form disclosed. Rather, the intention is to cover all modifications, equivalents and alternatives falling within the spirit and scope of the method and apparatus for partial encryption of frame-based electronic content as defined by the appended claims. Any headings used herein are for organizational purposes only and are not meant to limit the scope of the description or the claims. As used herein, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION OF EMBODIMENTS

Various embodiments of a method and apparatus for converting an animated sequence of images into a document page are described. In the following detailed description, numerous specific details are set forth to provide a thorough understanding of claimed subject matter. However, it will be understood by those skilled in the art that claimed subject matter may be practiced without these specific details. In other instances, methods, apparatuses or systems that would be known by one of ordinary skill have not been described in detail so as not to obscure claimed subject matter.

Some portions of the detailed description which follow are presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and is generally, considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these or similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

FIG. 1 is a block diagram of a computerized device 100 for converting an animated sequence of images into a document page according to one or more embodiments.

The computerized device 100 is a type of data processing device (e.g., a laptop, a desktop, a Personal Digital Assistant (PDA), a tablet, a smart phone (e.g., APPLE® iPhone), other data processing and display systems or devices and/or the like) known to one of ordinary skill in the art having the benefit of this disclosure. Details of a computerized device that can function as the computerized device 100 is described with respect to FIG. 6. The computerized device 100 comprises a Central Processing Unit (CPU) 102, various support circuits 104 and a memory 106. The CPU 102 may comprise one or more commercially available microprocessors or microcontrollers that facilitate data processing and storage. Various support circuits 104 facilitate operation of the CPU 102 and may include clock circuits, buses, power supplies, input/output circuits and/or the like. The memory 106 includes a read only memory, random access memory, disk drive storage, optical storage, removable storage, and the like. The memory 106 includes various software packages, such as an operating system 108, an application 110 and a graphics component 112 as well as various data, such as a file 114, a file 116 and attribute data 120. The file 114 and the file 116 are arranged in different formats according to some embodiments. The file 114 includes graphical data in the form a plurality of images 118. The attribute data 120 refers to software application settings associated with presenting the plurality of images 118 as an animation.

The operating system 108 generally manages various computerized device resources (e.g., network resources, data storage resources, file system resources and/or the like). The operating system 108 is configured to execute operations on one or more hardware and/or software devices, such as Network Interface Cards (NICs), hard disks, virtualization layers, firewalls and/or the like. For example, the various software packages call commands associated with the operating system 108 (i.e., native operating system commands) to perform various file system and/or storage operations, such as creating files or metadata, writing data to the files, reading data from the files, modifying metadata associated with the files and/or the like. The operating system 108 may call one or more functions associated with device drivers to execute various file system and/or storage operations.

The application 110 is any type of software application (e.g., ADOBE® Acrobat, an ADOBE® Flash Player, an AIR (ADOBE® Integrated Runtime) application and/or the like). The application 110 includes software code (e.g., processor executable instructions) for presenting various forms of data to a user through a display device. For example, the application 110 may create and/or display various types of documents (e.g., PDF documents). The application 110 may store the document as a computer file, such as the file 116. As explained further below, the application 110 may use the graphics component 112 to transform an animated sequence of images 118 and the attribute data 120 into content partitions of the file 116. The attribute data 120 defines a manner at which the images 118 are presented to the user when viewing the file 114.

Figure 2:
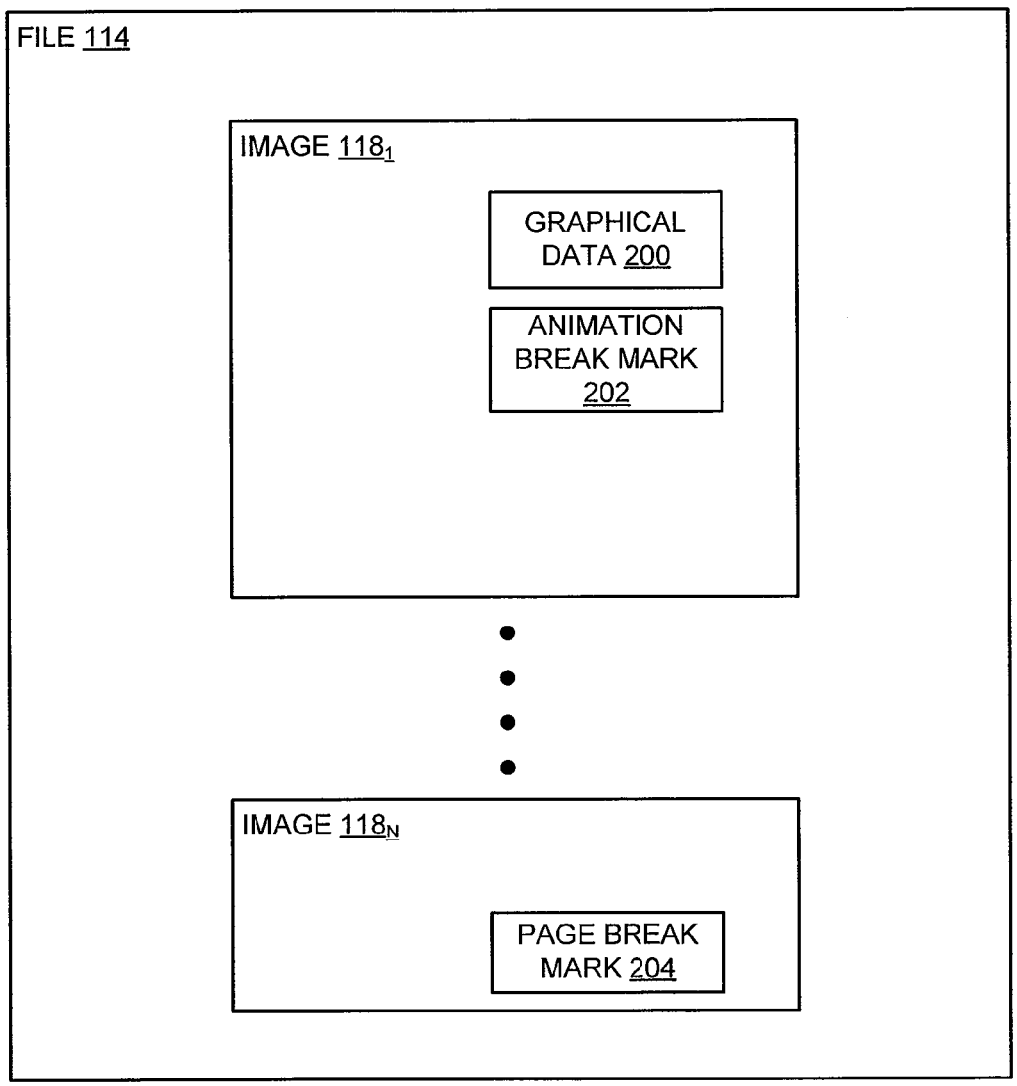
FIG. 2 illustrates a file that includes an animated sequence of images according to one or more embodiments.

FIG. 2 illustrates the file 114 that includes the plurality of images 118 according to one or more embodiments. Each of the plurality of images 118 constitutes a complete portion of an animated image sequence and includes graphical data 200 and an animation break mark 202. Each image 118 of the animated sequence conveys a pictograph to a user that represents a concept according to some embodiments. Each of the plurality of images 118 bears a temporal relationship to each preceding image and/or each succeeding image. At an end of the graphical data 200, each of the images 118 includes the animation break mark 202 indicating an end of the portion of the animated image sequence. For example, the animation break mark 202 may indicate an end of one image in an animation effect of a PowerPoint presentation.

In some embodiments, the plurality of images 118 are stored and presented as an animation on a single page, such as an animation effect on a PowerPoint presentation slide. Hence, a page break mark 204 includes a final character of a final image of the plurality of images 118 and indicates the completion of the animated image sequence, which is produced as a document page on a second file (e.g., the file 116 of FIGS. 1 and 3). As explained further below, the plurality of images 118 are transformed into content partitions and combined to form the document page.

Figure 3:
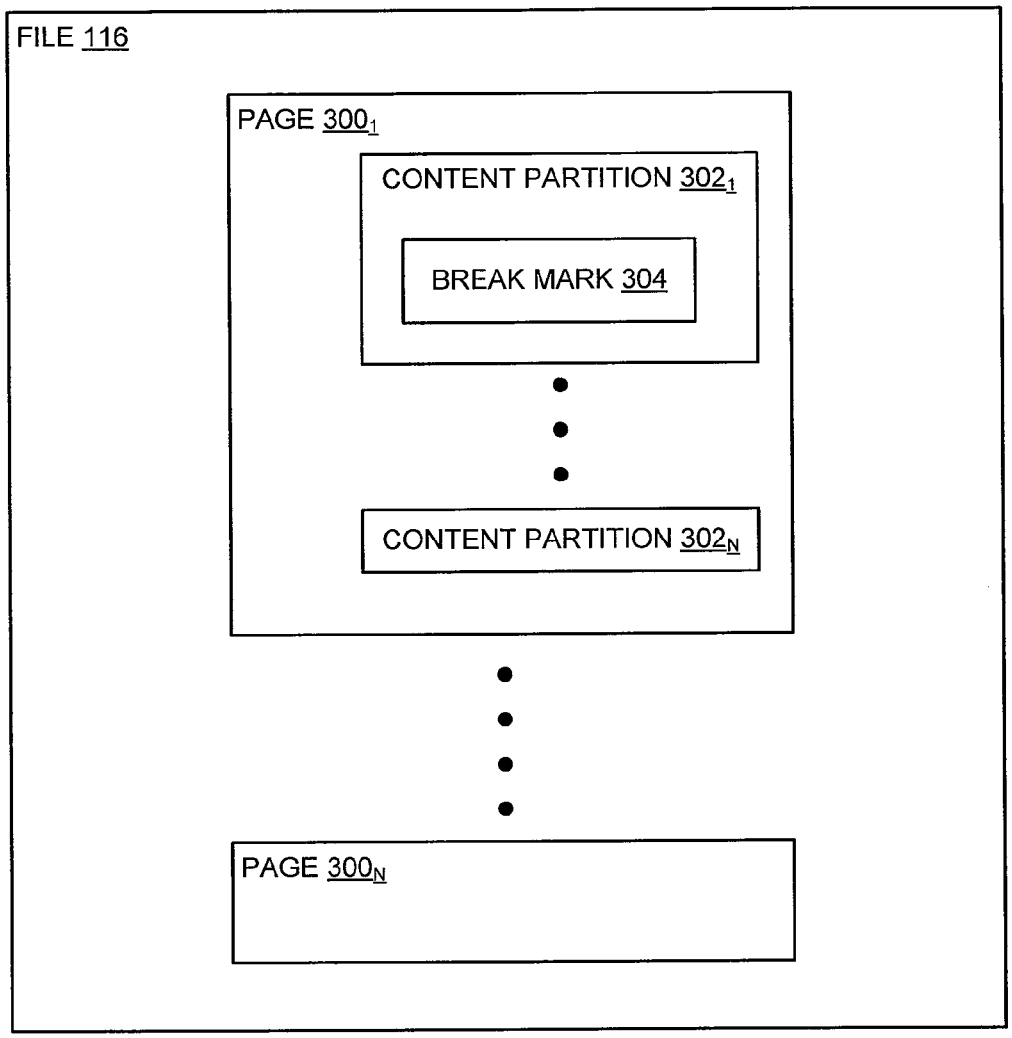
FIG. 3 illustrates a file that includes content partitions according to one or more embodiments.

FIG. 3 illustrates the file 116 that includes a plurality of document pages 300 according to one or more embodiments. One or more of the plurality of document pages 300 include one or more content partitions 302. Each content partition 302 is a document object that includes graphical data (e.g., the graphical data 200 of FIG. 2). The graphical data includes one or more images as well as various attributes for presenting the one or more images to the user. The one or more content partitions 302 may also be referred to as content groups or document layers. Each of the content partitions 302 also includes a break mark 304, such as a content partition break mark or a document layer break mark, according to some embodiments.

The content partitions 302 define a mechanism for selectively controlling the visibility of page content. A graphical component (e.g., the graphical component 112 of FIG. 1) of a software application (e.g., the software application 110 of FIG. 1) uses various attributes to create and control the content partitions 302 through JavaScript or any similar application platform. These attributes permit manipulation of graphical data (e.g., the graphical data 200 of FIG. 2) that is within a first file (e.g., the file 114 of FIGS. 1 and 2). In some embodiments, the graphical component provides a user interface using various design layout software tools, such as FlexBuilder or VisualStudio or XCode. Each element of the user interface includes one or more images (e.g., graphical objects, such as a rectangle) of the animated sequence of images. In order to navigate the user interface, a mouse wheel and button enable switching between different elements according to some embodiments. For example, a user may move the mouse wheel in order to access a subsequent one of the content partitions 302 and present a next image(s) in the animated sequence of images.

Optional content groups are used to create document pages having multiple document layers, such as multi-language documents, multiple layered views for architectural plans, animation effects and/or the like. Similar to an animation break mark of the file 114, the break mark 304 indicates an end of a portion of an animated sequence of images (e.g., the plurality of images 118). For example, the break mark 304 indicates an end of each document layer on PDF page. In some embodiments, the content partitions 302 associated with PDF files are also known as Optional Content Groups (OCGs). The content partitions 302 may also include document layers in InDesign and QuarkXPress and top level layers in ADOBE® Illustrator and ADOBE® Photoshop. Each of the content partitions 302 may include one or more graphical objects. Various attributes define presentation of these content partitions 302. For example, the content partitions 302 may be made visible or invisible. As another example, the content partitions 302 may show or hide any combination of the contained graphical objects.

Figure 4:
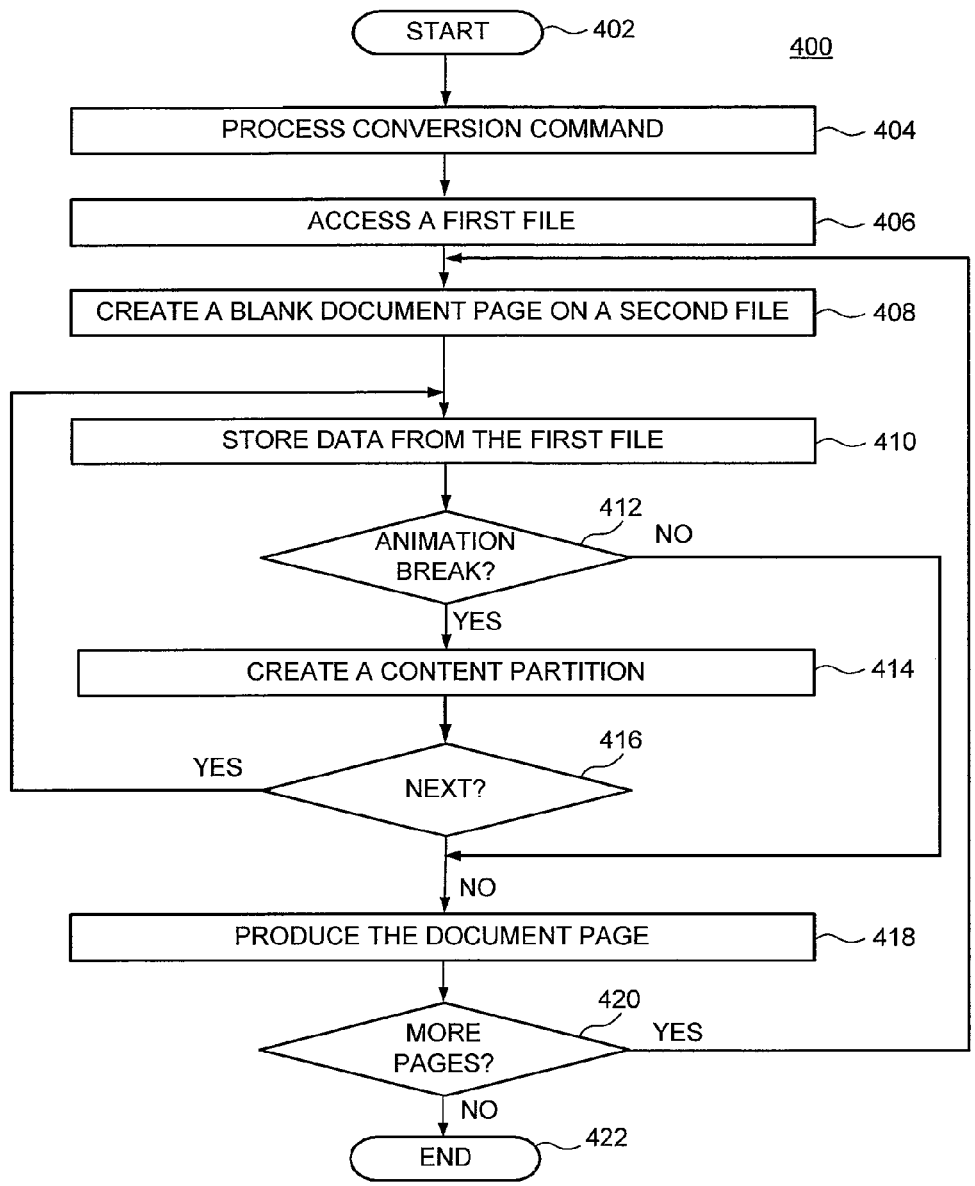
FIG. 4 is a flow diagram of a method of converting an animated sequence of images into a document page according to one or more embodiments.

FIG. 4 is a flow diagram of a method 400 of converting an animated sequence of images into a document page according to one or more embodiments. In some embodiments, each and every step of the method 400 is performed by a graphics component (e.g., the graphics component 112 of FIG. 1). In other embodiments, one or more steps are skipped or omitted. The method 400 starts at step 402 and proceeds to step 404.

At step 404, the method 400 processes a conversion command. For example, user may initiate a process for converting an animation effect into a PDF file. At step 406, the method 400 accesses a first file. In some embodiments, the first file is non-PDF file, such as MICROSOFT® WORD document or POWERPOINT presentation. At step 408, the method 400 creates a blank document page on a second file. In some embodiments, the second file is a PDF or similar file. At step 410, the method 400 stores data from the first file. In some embodiments, the method 400 copies static, non-graphical data into the second file.

At step 412, the method 400 determines whether the data from the first file includes an animation break (e.g., the animation break mark 202). If the method 400 identifies the animation break, the method 400 proceeds to step 414. If the first file includes at least one animation break, the method 400 separates the first file into a plurality of images that form the animated sequence. At step 414, the method 400 creates a content partition. In some embodiments, the method 400 adds the content partition to a blank document page as a document layer. Each subsequent content partition is also added as a document layer on the document page and positioned after previous content partition. If, on the other hand, the method 400 does not identify the animation break within the data from the first file, the method 400 skips step 414 and step 416 and proceeds to step 418 because a next break mark is most likely a page break.

At step 416, the method 400 determines whether there is a next animation break within the data from the first file. If there is another animation break, the method 400 returns to step 410. If, on the other hand, there are no more animation breaks within the data of the first file, the method 400 proceeds to step 418. At step 418, the method 400 produces the document page. At step 420, the method 400 determines whether there are more pages within the first file. If the method 400 determines that there are more pages, the method 400 returns to step 408. If, on the other hand, the method 400 determines that there are no more pages, the method 400 proceeds to step 422. At step 422, the method 400 ends.

Figure 5:
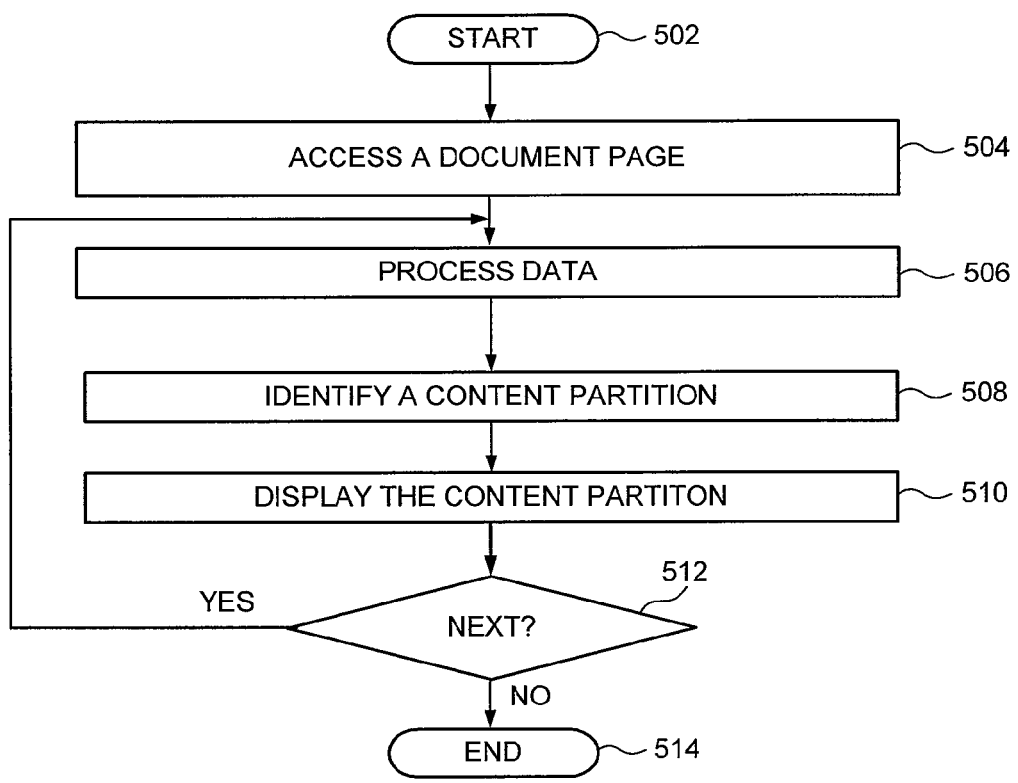
FIG. 5 is a flow diagram of a method for displaying a document page that includes an animated sequence of images according to one or more embodiments.

FIG. 5 is a flow diagram of a method 500 for displaying a document page that includes an animated sequence of images. In some embodiments, each and every step of the method 500 is performed by an application (e.g., the application 110 of FIG. 1). In other embodiments, one or more steps are skipped or omitted. The application performs the method 500 to present each page of a document having content partitions. When displaying a document page that does not have an animated sequence of images and only includes static content, the application may employ any one of a variety of known techniques. The method 500 starts at step 502 and proceeds to step 504.

At step 504, the method 500 accesses a document page. At step 506, the method 500 processes data within the document page. The method 500 reads and displays static content as well as any content not included within any content partition. At step 508, the method 500 identifies a content partition. In some embodiments, the content partition constitutes a user interface element and includes one or more graphical objects. In order to switch between content partitions, a user may provide input in the form of mouse wheel movement such that current user interface element is made invisible and a next user interface element is displayed. At step 510, the method 500 displays the content partition. Each content partition is layered below a previous content partition. Initially, the method 500 presents a top most content partition on the document page.

At step 512, the method 500 determines whether there is a next content partition within the document page. If there is a next content partition, the method 500 returns to step 506. In some embodiments, the method 500 presents a next content partition after receiving user input. If the method 500 receives a command to view the next content partition, the method loads graphical data until a break mark (e.g., the break mark 304) is read. The next content partition command may include, but is not limited to, a mouse click, a keystroke (e.g., enter key, space key and/or the like), a menu button click. Alternatively, the method 500 automatically displays the next content partition after a time interval. In some embodiments, the method 500 receives a command (e.g., a specific keystroke) to skip the next content partition and proceed to a next document page. If, on the other hand, there are no more content partitions, the method 500 proceeds to step 514. At step 514, the method 500 ends.

Figure 6:
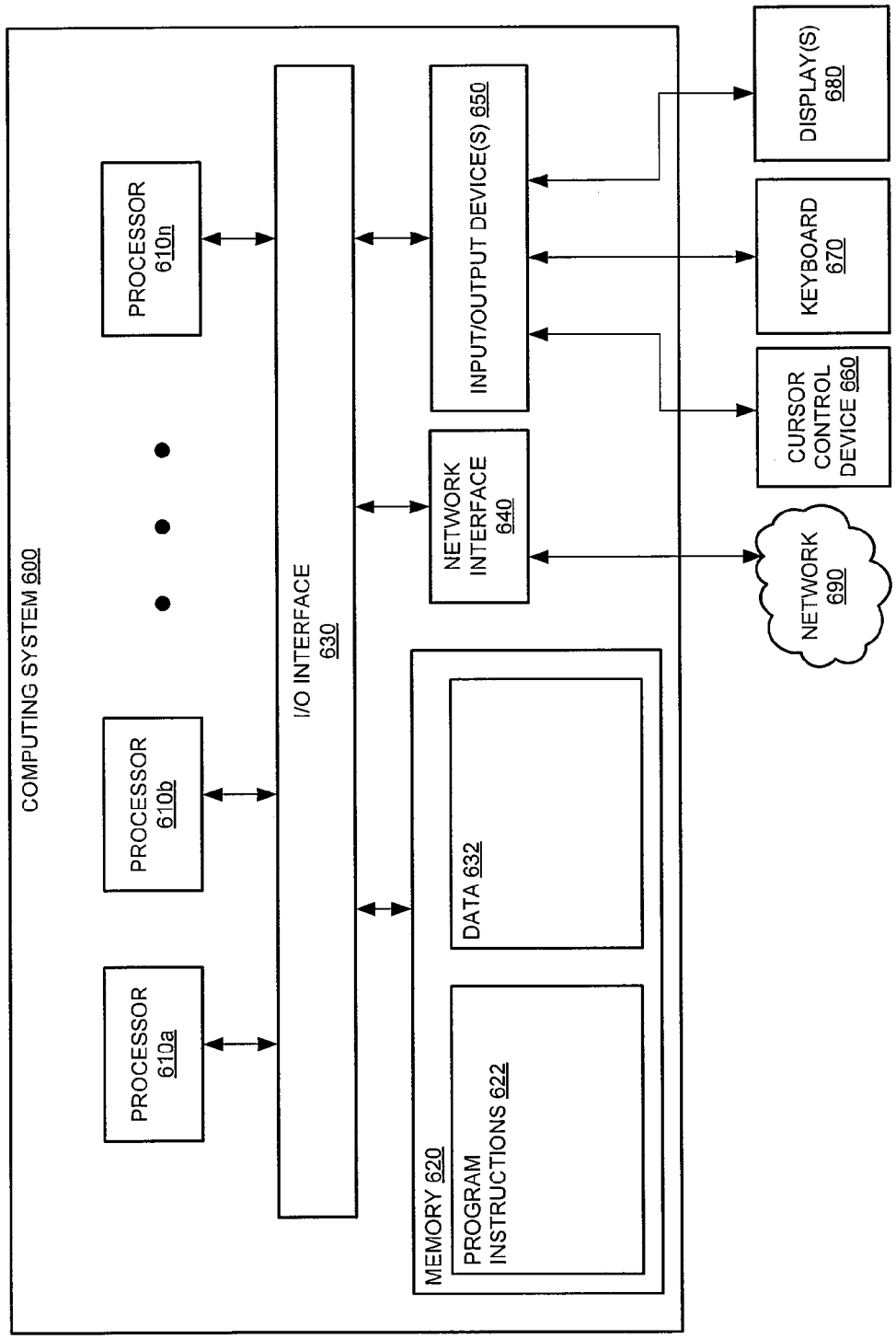
FIG. 6 is a schematic diagram of a computing system that can be used as a computer for converting an animated sequence of images into a document page according to one or more embodiments.

FIG. 6 is a schematic diagram of a computing system that can be used as a computer for converting an animated sequence of images into a document page according to one or more embodiments.

Example Computer System

Various embodiments of a method and apparatus for converting an animated sequence of images into a document page, as described herein, may be executed on one or more computer systems, which may interact with various other devices. One such computer system is computer system 600 illustrated by FIG. 6, which may in various embodiments implement any of the elements or functionality illustrated in FIGS. 1-5. In various embodiments, computer system 600 may be configured to implement the graphics component 112 described above. While the illustrated system demonstrates computer system 600 implementing the graphics component 112, computer system 600 may be used to implement any other system, device, element, functionality or method of the above-described embodiments. In the illustrated embodiments, computer system 600 may be configured to implement the graphics component 112 as processor-executable executable program instructions 622 (e.g., program instructions executable by processor(s) 610) in various embodiments.

In the illustrated embodiment, computer system 600 includes one or more processors 610 coupled to a system memory 620 via an input/output (I/O) interface 630. Computer system 600 further includes a network interface 640 coupled to I/O interface 630, and one or more input/output devices 650, such as cursor control device 660, keyboard 670, and display(s) 680. In various embodiments, any of components 660, 670, and 680 may be utilized by the graphics component 112 to receive data 632 described above. In various embodiments, a user interface may be generated and displayed on display 680. In some cases, it is contemplated that embodiments may be implemented using a single instance of computer system 600, while in other embodiments multiple such systems, or multiple nodes making up computer system 600, may be configured to host different portions or instances of various embodiments. For example, in one embodiment some elements may be implemented via one or more nodes of computer system 600 that are distinct from those nodes implementing other elements. In another example, multiple nodes may implement computer system 600 in a distributed manner.

In different embodiments, computer system 600 may be any of various types of devices, including, but not limited to, a personal computer system, desktop computer, laptop, notebook, or netbook computer, mainframe computer system, handheld computer, workstation, network computer, a camera, a set top box, a mobile device, a consumer device, video game console, handheld video game device, application server, storage device, a peripheral device such as a switch, modem, router, or in general any type of computing or electronic device.

In various embodiments, computer system 600 may be a uniprocessor system including one processor 610, or a multiprocessor system including several processors 610 (e.g., two, four, eight, or another suitable number). Processors 610 may be any suitable processor capable of executing instructions. For example, in various embodiments processors 610 may be general-purpose or embedded processors implementing any of a variety of instruction set architectures (ISAs), such as the x96, PowerPC, SPARC, or MIPS ISAs, or any other suitable ISA. In multiprocessor systems, each of processors 610 may commonly, but not necessarily, implement the same ISA.

System memory 620 may be configured to store program instructions 622 and/or data 632 accessible by processor 610. In various embodiments, system memory 620 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing any of the elements of the embodiments described above may be stored within system memory 620. In other embodiments, program instructions and/or data may be received, sent or stored upon different types of computer-accessible media or on similar media separate from system memory 620 or computer system 600.

In one embodiment, I/O interface 630 may be configured to coordinate I/O traffic between processor 610, system memory 620, and any peripheral devices in the device, including network interface 640 or other peripheral interfaces, such as input/output devices 650, In some embodiments, I/O interface 630 may perform any necessary protocol, timing or other data transformations to convert data signals from one components (e.g., system memory 620) into a format suitable for use by another component (e.g., processor 610). In some embodiments, I/O interface 630 may include support for devices attached through various types of peripheral buses, such as a variant of the Peripheral Component Interconnect (PCI) bus standard or the Universal Serial Bus (USB) standard, for example. In some embodiments, the function of I/O interface 630 may be split into two or more separate components, such as a north bridge and a south bridge, for example. Also, in some embodiments some or all of the functionality of I/O interface 630, such as an interface to system memory 620, may be incorporated directly into processor 610.

Network interface 640 may be configured to allow data to be exchanged between computer system 600 and other devices attached to a network (e.g., network 690), such as one or more external systems or between nodes of computer system 600. In various embodiments, network 690 may include one or more networks including but not limited to Local Area Networks (LANs) (e.g., an Ethernet or corporate network), Wide Area Networks (WANs) (e.g., the Internet), wireless data networks, some other electronic data network, or some combination thereof. In various embodiments, network interface 640 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 650 may, in some embodiments, include one or more display terminals, keyboards, keypads, touchpads, scanning devices, voice or optical recognition devices, or any other devices suitable for entering or accessing data by one or more computer systems 600. Multiple input/output devices 650 may be present in computer system 600 or may be distributed on various nodes of computer system 600. In some embodiments, similar input/output devices may be separate from computer system 600 and may interact with one or more nodes of computer system 600 through a wired or wireless connection, such as over network interface 640.

In some embodiments, the illustrated computer system may implement any of the methods described above, such as the methods illustrated by the flowcharts of FIGS. 4-5. In other embodiments, different elements and data may be included.

Those skilled in the art will appreciate that computer system 600 is merely illustrative and is not intended to limit the scope of embodiments. In particular, the computer system and devices may include any combination of hardware or software that can perform the indicated functions of various embodiments, including computers, network devices, Internet appliances, PDAs, wireless phones, pagers, etc. Computer system 600 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 600 may be transmitted to computer system 600 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium or via a communication medium. In general, a computer-accessible medium may include a storage medium or memory medium such as magnetic or optical media, e.g., disk or DVD/CD-ROM, volatile or non-volatile media such as RAM (e.g., SDRAM, DDR, RDRAM, SRAM, etc.), ROM, etc.

The methods described herein may be implemented in software, hardware, or a combination thereof, in different embodiments. In addition, the order of methods may be changed, and various elements may be added, reordered, combined, omitted, modified, etc. All examples described herein are presented in a non-limiting manner. Various modifications and changes may be made as would be obvious to a person skilled in the art having benefit of this disclosure. Realizations in accordance with embodiments have been described in the context of particular embodiments. These embodiments are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

Various elements, devices, modules and circuits are described above in associated with their respective functions. These elements, devices, modules and circuits are considered means for performing their respective functions as described herein.

While the foregoing is directed to embodiments of the present invention, other and further embodiments of the invention may be devised without departing from the basic scope thereof, and the scope thereof is determined by the claims that follow.

The invention claimed is:

1. A computerized method for converting an animated sequence of images into a document page, comprising:
accessing a first file;
detecting in the first file an animation effect comprising an animated sequence of a plurality of images;
creating, by at least one processor, a PDF page with a plurality of layers corresponding to the plurality of images in the animation effect, by including each image from the plurality of images in a layer of the plurality of layers in an order corresponding to a temporal order of the images in the animated sequence; and
consecutively displaying, via a display device, the layers of the plurality of layers in the PDF page in the order to recreate the animation effect of the first file in the PDF page.

2. The method of claim 1, wherein creating the PDF page with the plurality of layers further comprises creating a break mark between consecutive layers.

3. The method of claim 1, wherein the first file comprises multimedia content that allows for the display of the animation effect.

4. The method of claim 1, further comprising detecting animation break marks corresponding to the plurality of images.

5. The method of claim 4, wherein accessing the first file further comprises separating the first file into the plurality of images by each animation break mark.

6. The method of claim 4, wherein creating the PDF page further comprises creating a layer corresponding to each animation break mark.

7. The method of claim 1, wherein the temporal order comprises a temporal relationship between each of the images in the animated sequence and at least one of a preceding or succeeding image in the animated sequence.

8. The method of claim 1, wherein consecutively displaying the plurality of layers in the PDF page comprises: controlling visibility of layers such that a first layer is visible and a second layer is not visible at a first point in time and the second layer is visible and the first layer is not visible at a second point in time.

9. The method of claim 1, wherein consecutively displaying the layers to recreate the animation effect of the first file further comprises:
displaying a first layer;
detecting user input; and
based on the user input, displaying a next layer according to the order.

10. The method of claim 1, wherein consecutively displaying the layers to recreate the animation effect of the first file further comprises:
displaying a first layer for a time interval;
detecting an end of the time interval; and
based on the detected end of the time interval, displaying a next layer according to the order.

11. The method of claim 10, further comprising displaying each layer individually in the animated sequence for the time interval.

12. The method of claim 1, wherein selectively displaying the layers comprises:
displaying a first layer for a time interval;
detecting an end of the time interval; and
based on the detected end of the time interval, displaying a next layer according to the order.

13. A computerized system for converting an animated sequence of images into a document page, comprising:
- at least one processor;
- at least one non-transitory computer readable storage medium storing instructions thereon, that, when executed by the at least one processor, cause the system to:
- access a first file, wherein the first file is not a PDF;
- detect in the first file an animation effect comprising an animated sequence of a plurality of images;
- create a PDF page with a plurality of layers corresponding to the plurality of images in the animation effect, by including each images from the plurality of images in a layers of the plurality of layers in an order corresponding to a temporal order of the images in the animated sequence; and
- consecutively display the layers of the plurality of layers in the PDF page in the order to recreate the animation effect of the first file in the PDF page.

14. The system of claim 13, wherein the instructions, when executed by the at least one processor, cause the system to consecutively display the plurality of layers in the PDF page by:
- displaying a first layer;
- detecting user input; and
- based on the user input, displaying a next layer according to the order.

15. The system of claim 13, further comprising instructions that when executed by at least one processor, cause the system to:
- detect animation break marks corresponding to the plurality of images; and
- create a layer corresponding to each animation break mark.

16. The system of claim 13, wherein the instructions, when executed by the at least one processor, cause the system to consecutively display the plurality of layers in the PDF page by:
- displaying a first layer for a time interval;
- detecting an end of the time interval; and
- based on the detected end of the time interval, displaying a next layer according to the order.

17. A non-transitory computer readable medium storing instructions thereon that, when executed by at least one processor, cause a computer system to perform a method comprising:
- accessing a first file;
- detecting in the first file an animation effect comprising an animated sequence of a plurality of images;
- creating a PDF page with a plurality of layers corresponding to the plurality of images in the animation effect, by including each image from the plurality of images in a layer of the plurality of layers in an order corresponding to a temporal order of the images in the animated sequence; and
- consecutively displaying, via a display device, the layers of the plurality of layers in the PDF page in the order to recreate the animation effect of the first file in the PDF page.

18. The non-transitory computer readable medium of claim 17, wherein the first file comprises multimedia content that allow for display of the animation effect.

19. The non-transitory computer readable medium of claim 17, wherein the method further comprises:
- detecting animation break marks corresponding to the plurality of images; and
- creating a layer for each animation break mark.

20. The non-transitory computer readable medium of claim 17, wherein consecutively displaying the layers comprises:
- displaying a first layer;
- detecting user input; and
- based on the user input and the animated sequence, displaying a next layer according to the order.

* * * * *